(12) United States Patent
Brown

(10) Patent No.: US 7,589,730 B1
(45) Date of Patent: Sep. 15, 2009

(54) SYSTEM AND METHOD FOR DRAWING A DASHED PATH

(75) Inventor: Donald P. Brown, Bothell, WA (US)

(73) Assignee: Adobe Systems Incorporated, San Jose, CA (US)

(*) Notice: Subject to any disclaimer, the term of this patent is extended or adjusted under 35 U.S.C. 154(b) by 657 days.

(21) Appl. No.: 11/134,761

(22) Filed: May 20, 2005

(51) Int. Cl.
*G06T 11/20* (2006.01)
*G09G 5/00* (2006.01)

(52) U.S. Cl. ............... 345/442; 345/441; 345/619; 345/660

(58) Field of Classification Search .......... 345/619, 345/660, 441, 442
See application file for complete search history.

(56) References Cited

U.S. PATENT DOCUMENTS

| | | | |
|---|---|---|---|
| 5,831,632 A | 11/1998 | Schuster et al. | |
| 6,310,622 B1 | 10/2001 | Asente | |
| 6,522,328 B1 | 2/2003 | Asente | |
| 6,714,207 B2 | 3/2004 | Asente | |

*Primary Examiner*—Chante Harrison
(74) *Attorney, Agent, or Firm*—Robert C Kowert; Meyertons, Hood, Kivlin, Kowert & Goetzel, P.C.

(57) ABSTRACT

A system and method for rendering or facilitating the rendering of an attractive dashed path. A dashed path comprises a pattern of alternating stroke and gap segments; different dash patterns employ different lengths of stroke and gap segments and/or repeat the segments with different frequency. A curve to be drawn with a dashed pattern is divided at critical features (e.g., endpoints, vertices, corners, cusps, intersections) into curve sections. For each curve section, the optimal number of times to repeat a dash pattern (a sequence of segments) is determined, and the optimal length of each segment is calculated, based on constraints specified in the segment's definition. The curve section is then broken into sub-curves corresponding to individual segments. After all curve sections are processed, a trailer may be added to the path, and all sub-curves of all curve sections are rendered.

7 Claims, 12 Drawing Sheets

Simple dash, split stroke segments at ends and vertices

Segments: stroke (4, 8, 16), gap (4, 8, 16)

startAt (1, 0.5), endAt (1, 0.5), vertex (1, 0.5)
header = 0; trailer = 0
minReps = 1; maxReps = 100

Simple dash, split stroke segments at ends and vertices

Segments: stroke (4, 8, 16), gap (4, 8, 16)

startAt (1, 0.5), endAt (1, 0.5), vertex (1, 0.5)
header = 0; trailer = 0
minReps = 1; maxReps = 100

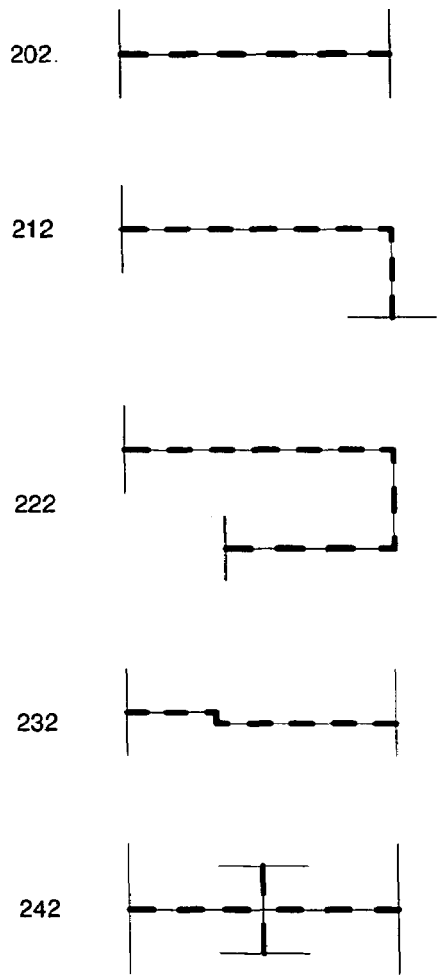
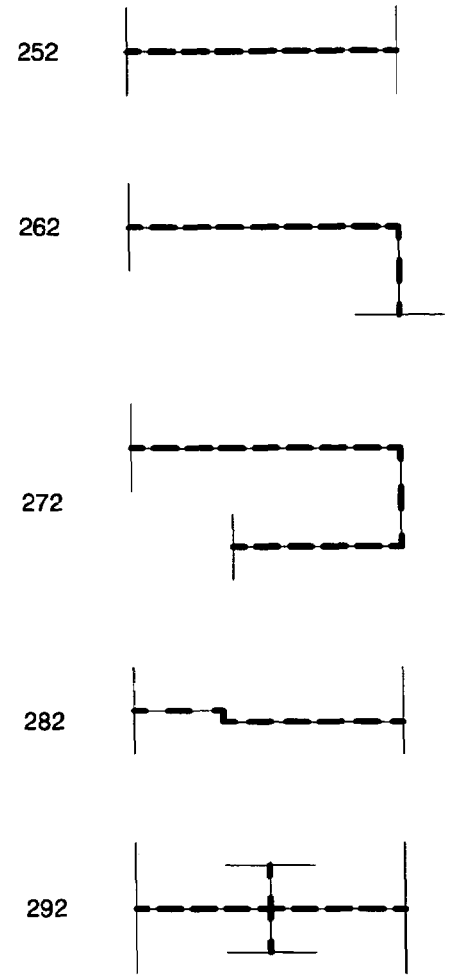
Simple dash, full end segments, split at vertex
Segments: stroke (4, 8, 16), gap (4, 8, 16)
startAt (1, 0), endAt (1, 1), vertex (1, 0.5)
header = 0; trailer = 0
minReps = 1; maxReps = 100
Simple dash, split at ends and vertex, scale only gaps
Segments: stroke (8, 8, 8), gap (2, 4, 8)
startAt (1, 0), endAt (1, 1), vertex (1, 0.5)
header = 0; trailer = 0
minReps = 1; maxReps = 100
FIG. 2A  FIG. 2B

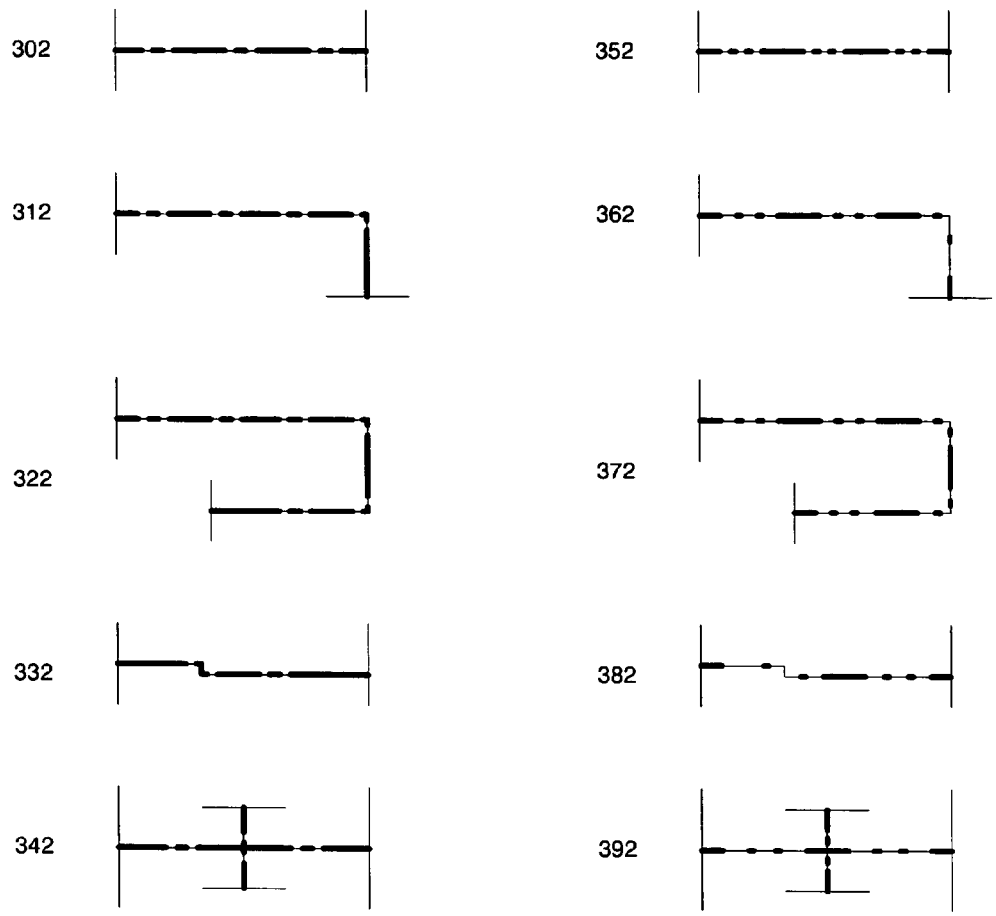

Phantom dash, split long stroke at ends, short strokes at vertex, scale only long strokes Segments: stroke (8, 16, 32), gap (4, 4, 4), stroke (4, 4, 4), gap (4, 4, 4)

startAt (1, 0.5), endAt (1, 0.5), vertex (3, 0.5)
header = 0; trailer = 0
minReps = 1; maxReps = 100

Hidden dash, split long strokes at ends, middle dots at vertex, scale only gaps

Segments: stroke (16, 16, 16), gap (2, 4, 8), stroke (2, 2, 2), gap (2, 4, 8), stroke (2, 2, 2), gap (2, 4, 8)

startAt (1, 0.5), endAt (1, 0.5), vertex (4, 0.5)
header = 0; trailer = 0
minReps = 1; maxReps = 100

FIG. 3A  FIG. 3B

CalcSegCounts: compute the number of times each Segment in the specified Segmentation Style's SDL will be used, for the indicated number of repetitions (numReps)

realnumlist CalcSegCounts(SegmentationStyle ss, int numReps):
for j in 1 to ss.numSegmentDefs:
    result[j] = numReps;

if j > ss.startAt.index:
        result[j] += 1;
    else if j == ss.startAt.index
        result[j] += (1 - ss.startAt.offset);

if j < ss.endAt.index:
        result[j] += 1;
    else if j == ss.endAt.index
        result[j] += ss.endAt.offset;

return result;

CalcTotalLen: calculate total length of curve having the specified segments (segcounts) and segment lengths (seglens)

real CalcTotalLen(realnumlist segcounts, realnumlist seglens):
result = 0;
for j in 1 to len(segcounts)
    result += segcounts[j] + seglen [j];

return result;

FIG. 5

ExpandUniformlyUpTo: Stretch Segments of the SDL from existing lengths (seglens), up to maxTotExpand ExpandUniformlyUpTo(VAR realnumlist seglens, realnumlist segcounts, SS ss, real maxTotExpand):

```
expandablecount = 0;                          // Determine which segments
minmaxexpand = infinity;                      // can expand, and by how much
for j in 1 to ss.numSegmentDefs:
        if seglens[j] < ss.SDL[j].maxLength:
                maxexp = ss.SDL[j].maxLength - seglens[j]
                if maxexp < minmaxexpand:
                        minmaxexpand = maxexp;
                        expandablecount += segcounts[j];
end for;

if expandablecount == 0:                      // If all segments are at max
        for j in 1 to ss.numSegmentDefs:      // lengths, expand them all
                seglens[j] += maxTotExpand / (sum of segcounts);
return seglens expandby = minmaxexpand;                      // Don't expand past goal
if expandablecount * expandby > maxTotExpand:
        expandby = maxTotExpand / expandablecount;

for j in 1 to ss.numSegmentDefs:              //Apply expansion
        if seglens[j] < ss.SDL[j].maxLength:
                seglens[j] += expandby;
return seglens
```

Realnumlist CalcBestLengths(SS ss, int numReps, real desiredTotal):
```
// Determine how many of each Segment to use
segcounts = CalcSegCounts(ss, numReps);

// Start with all Segments at optimal length
curlens = list of ss.SDL.optimalLengths;
curtot = CalcTotalLen(segcounts, curlens);

//Refine lengths
while curtot != desiredTotal;
        if curtot < desiredTotal:
                ExpandUniformlyUpTo(curlens, segcounts, ss, desiredTotal - curtot);
        else:
                ShrinkUniformlyDownTo(curlens, segcounts, ss, curtot-desiredTotal);
return curlens
```

FIG. 6

ShrinkUniformlyDownTo: Stretch Segments of the SDL from existing lengths (seglens), up to maxTotExpand ShrinkUniformlyDownTo(VAR realnumlist seglens, realnumlist segcounts, SS ss, real maxTotShrink):

```
shrinkablecount = 0;                          // Determine which segments
minmaxshrink = infinity;                      // can shrink, and by how much
for j in 1 to ss.numSegmentDefs:
        if seglens[j] > ss.SDL[j].minLength:
                maxshr = seglens[j] - ss.SDL[j].minLength
                if maxshr > minmaxshrink:
                        minmaxshrink = maxshr;
                        shrinkablecount += segcounts[j];
end for;

if shrinkablecount == 0:                      // If all segments are at min
        for j in 1 to ss.numSegmentDefs:      // lengths, shrink them all
                seglens[j] -= maxTotShrink / (sum of segcounts);
return seglens shrinkby = minmaxshrink;                      // Don't expand past goal
if shrinkablecount * shrinkby > maxTotShrink:
        shrinkby = maxTotShrink / shrinkablecount;

for j in 1 to ss.numSegmentDefs:              // Shrink
        if seglens[j] > ss.SDL[j].minLength:
                seglens[j] -= shrinkby;
return seglens
```

FIG. 7

```
s[i][1].curve = C[i] from beginning to length(ss.startAt.offset) * bestlens[ss.startAt.index];
s[i][1].style = SPS.PSL[curPaintIndex];

n[i] = 1;
curSegIndex = ss.startAt.index;
curPaintIndex = curSegIndex;
curRepNumber = -1                           // not yet a repetition // Advance cursegIndex & curRepNumber (wrapping); finished all whole repetitions?
while ()
        curSegIndex++;
        if (curSegIndex == ss.numSegmentDefs):
                cursegIndex = 1;
                curRepNumber ++;
                if (curRepNumber == numReps):
                        break                     // Done
        endif;
        curPaintIndex++;
        if (curPaintIndex == SPS.PSL.numPaintStyles):
                curPaintIndex = 1;

n[i] = n[i]++;
        s[i][n[i]].curve = C[i] from endof s[i][n[i]-1] to length(bestlens[ss.startAt.index];
        s[i][n[i]].style = SPS.PSL[curPaintIndex];
next;
```

FIG. 8

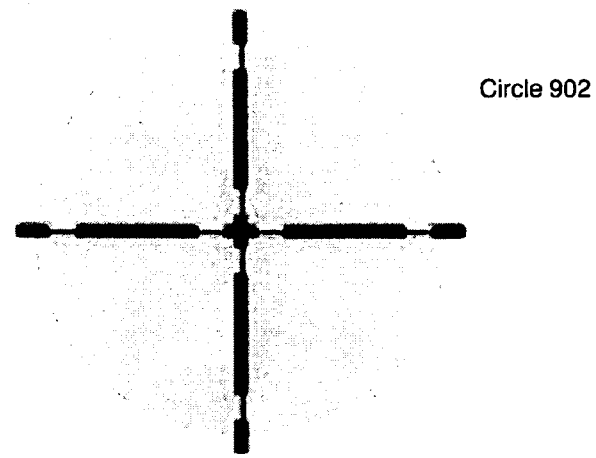
Circle 902
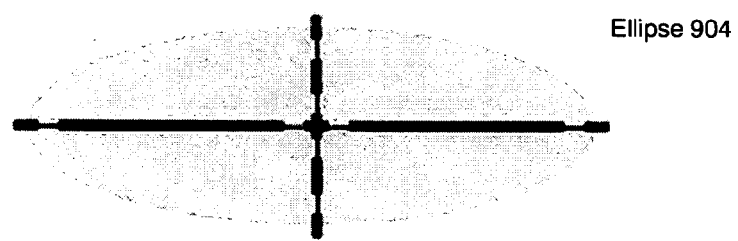
Ellipse 904
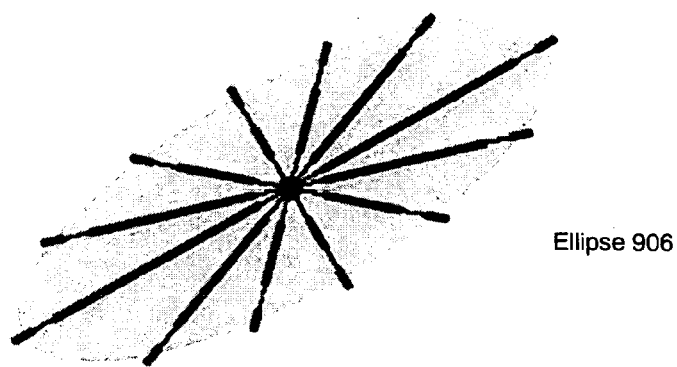
Ellipse 906
FIG. 9

SYSTEM AND METHOD FOR DRAWING A DASHED PATH

BACKGROUND

This invention relates to the field of computer systems. More particularly, a system and methods are provided for facilitating the drawing of visually pleasing dashed paths.

A dashed path is a sequence of adjacent (e.g., connecting) curves comprising alternating stroke segments and gap segments. Gap segments are blank or devoid of color, or of the same color as the background, while stroke segments are drawn in a foreground color that differs from the background color. A user-defined dashed path is normally defined as a series of stroke and gap segments, of specified lengths, leading from the starting point of the path to the end point.

A dashed path looks best when critical portions of the path (e.g., corners, intersections with other graphical elements, endpoints) are bisected or highlighted by stroked segments. When, instead, a critical portion is bisected by an off-center stroke segment or gap, the line may be less attractive.

Traditional drawing tools and methods generally produce unattractive dashed paths, because they strictly apply defined stroke segments and gap segments from a starting point to an ending point without regard for the resulting appearance. For example, on anything other than line segments, these tools and methods fail to straddle corners (and other key features) and often do not terminate precisely at the endpoints of the path. Only by chance are critical path portions covered by stroke segments.

In addition, these tools generally do not allow the length of a stroke segment or gap segment to be scaled, or otherwise allow for the dynamic adjustment of a segmentation pattern to place stroke segments so as to make the result more visually pleasing.

Because they do not support scaling of segments, traditional drawing tools also do not allow variable scaling, wherein some segments remain fixed in size and/or position and other segments of the same curve or path are permitted to expand or contract in size. Yet further, traditional drawing tools do not support the drawing of paths using multi-dimensional pattern drawing.

Therefore, there is a need for a system and a method of applying and scaling stroke or gap segments of a user-defined path to make the resulting dashed path more attractive.

SUMMARY

In one embodiment of the invention, a system and method are presented for rendering or facilitating the rendering of an attractive dashed path. A dashed path comprises a pattern of alternating stroke and gap segments; different dash patterns may employ different lengths of stroke and gap segments and/or repeat the segments with different frequency.

Per-segment constraints may be established for controlling the appearance of individual segments of the path. For example, by establishing minimum, maximum and optimal length constraints, a given segment may be scaled independently of other segments. In addition, a segment need not terminate at its start or end point; drawing of a segment may begin or end at any point along its length. Constraints may also be established for particular points or types of points on a path (e.g., endpoints, vertices, corners, cusps, intersections), to specify whether they should be overlaid with stroke or gap segments, for example.

In this embodiment, a curve to be drawn with a dashed pattern is divided at its critical points (e.g., endpoints, vertices, corners, cusps, intersections, local minima, local maxima) into curve sections. For each curve section, the optimal number of times to repeat a dash pattern (a sequence of segments) is determined, and the optimal length of each segment is calculated. The curve section is then broken into sub-curves corresponding to individual segments. After all curve sections are processed a trailer may be added to the path, and all sub-curves of all curve sections are rendered. Each segment may have an associated style to indicate how it should be rendered (e.g., brush style, color, cap/join style, thickness).

Segments, whether strokes or gaps, may be defined using constraints such as minimum length, maximum length, optimal length, etc. These constraints may be used when determining the actual lengths to draw each segment. Segments for producing a dashed curve may be specified in a Segment Definition List (SDL). To draw the curve, one SDL's Segments may be applied repeatedly to produce a dashed pattern over the length of the curve or constituent curve sections or sub-curves.

A Segmentation Style (SS) may be defined to specify which SDL or SDLs to apply to a curve, and may include parameters indicating how to apply an SDL. The SS may specify which Segment to start or end the curve with, a minimum or maximum number of times to repeat the SDL's Segments, etc.

A Segmentation Painting Style (SPS) may be defined to identify the SS to apply to a curve, as well as a collection of Paint Styles with which to render the specified Segments. Different Paint Styles may be applied to different Segments, and may identify a color, brush pattern, thickness and/or other parameters for rendering the Segment.

DESCRIPTION OF THE FIGURES

FIGS. 2-3 illustrated how dashed paths may be drawn according to one embodiment of the invention.

FIGS. 5-8 illustrate exemplary pseudo-code for facilitating the method of FIG. 4, according to one embodiment of the invention.

FIGS. 9-12 illustrate some dashed paths that may be produced using embodiments of the present invention.

DETAILED DESCRIPTION

Figure 1:
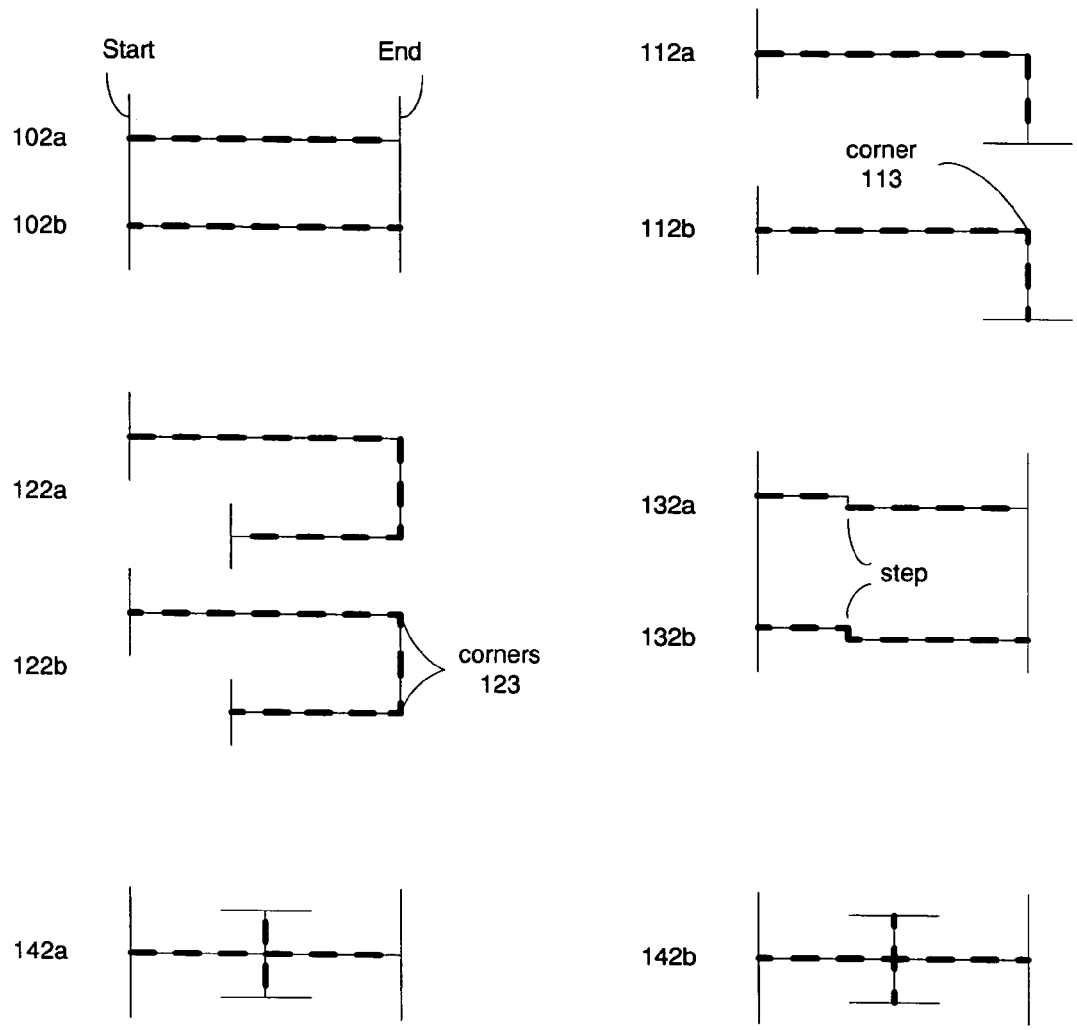
FIG. 1 is a block diagram depicting how traditional drawing tools may render dashed paths, and how such paths may be rendered in an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for facilitating the definition and/or drawing of a dashed curve or path. More particularly, in this embodiment a user or drawing tool selects or defines a curve to be dashed. Critical portions of the curve are identified (e.g., corners, vertices, cusps, intersections, endpoints) and used to divide the curve into curve sections. A desired dash pattern (i.e., alternating stroke (dash) and gap (blank) segments) is then scaled to fit each curve section. For example, a curve section may be subdivided into sub-curves representing the stroke and gap segments to be drawn. Each segment (stroke or gap) may be scaled independently of other segments, so as to make the dashed path visually pleasing.

In one implementation, a user defines a number of Segments (e.g., stroke segments and gap segments), with each Segment having constraints such as minimum length, maximum length and optimal length. In other implementations, other constraints (e.g., color, thickness, shape) may be specified in addition to or instead of minimum, maximum and optimal lengths. A Segment may or may not be explicitly defined as a stroke or gap. For example, if a particular color is specified as a constraint, which may be "blank" in the case of a gap, the Segment is defined to be a stroke or gap, depending on whether the color matches the background color.

However, in one embodiment of the invention, Segments become stroke segments or gap segments only when they are actually drawn or rendered, depending on the Paint Style applied to the Segment. In this embodiment, a Paint Style defines how a curve or path should be rendered after its pattern of Segments is selected. For example, a Paint Style may specify a brush style (e.g., color or pattern), cap/join styles, how wide to draw the curve or particular Segments, miter limits, etc. A Paint Style may be "empty," meaning that nothing, or a gap, is to be painted.

The per-Segment constraints allow each segment to be scaled independently of other segments. Thus, Segments applied to one curve section may be longer or shorter than similar Segments applied to another curve section. Constraints may also be associated with critical portions of a path to ensure they are covered by stroke segments (or gap segments) or to apply a particular style of cap, join, mitering, etc. Further, a Segment may begin or end at any point along its length; it need not terminate only at its endpoints.

Any number of Segments may be combined to form an ordered list of Segments, which may be termed a Segment Definition List (SDL). When a curve is to be rendered, drawing begins at a specified Segment within an SDL. After the specified initial Segment, succeeding Segments in the SDL are applied to the curve in their ordered sequence. If the curve is longer than the length of all Segments in the SDL, the SDL may be applied multiple times until the endpoint of the curve is reached. One or more Segments within an SDL may be scaled to better fit the SDL to the curve.

A Segmentation Style (SS) may be defined for purposes of applying a particular Segment Definition List to a curve or a section of a curve. The Segmentation Style identifies the SDL and comprises a set of parameters for applying the SDL. As described below, for example, a Segmentation Style's parameters may specify which Segments to start and/or end the curve with, a minimum or maximum number of times to repeat the SDL, whether a header or trailer should be added to the curve, etc. Multiple Segmentation Styles may be applied, with repetition if necessary, to cover a curve. For example, different Segmentation Styles may be applied to different sections of a curve. Similarly, different SDLs may be applied to different sections of a curve.

TABLE 1 identifies fields or parameters for defining a Segment, according to one embodiment of the invention. In this embodiment, the identified fields serve as constraints on the Segment's configuration when drawn.

TABLE 1

(Segment)

| Field | Description |
| --- | --- |
| minLength | Minimum length; 0 < minLength < ∞ |
| optimalLength | Preferred length; 0 < optimalLength < ∞ |
| maxLength | Maximum length; 0 < maxLength < ∞ |

In this embodiment, the optimalLength of a Segment is the preferred length with which the Segment should be drawn. However, if the Segment needs to be scaled (e.g., because of the length of the curve or sub-curve on which the Segment is drawn), minLength and maxLength specify lower and upper boundaries on the Segment's scaled length. When the Segment is drawn, only as a last resort (e.g., after all Segments of the path have been scaled to their minLengths or maxLengths) will the Segment's minLength or maxLength parameters be violated.

A Segment definition may take the form (minLength, optimalLength, maxLength). Thus, a path segment that should be drawn at least 4 units long, but no longer than 16 units, and preferably 8 units long, would be represented as (4, 8, 16). In an embodiment of the invention, such a Segment may end up as either a stroke or gap segment, depending on the color with which it is drawn. For purposes of discussion, however, a Segment may be referred to specifically as a stroke segment (e.g., "stroke (4, 8, 16)") or gap segment (e.g., "gap (4, 8, 16)"). As another example, a Segment defined with all three constraints equal (e.g., (x, x, x)) indicates that the segment should take only one length—x units—and not be scaled.

One can see that a dashed path could therefore be defined as a series of stroke and gap segments, as in this simple dash example:

stroke (4, 8, 16), gap (4, 8, 16)

This example produces a simple dash pattern of one stroke followed by one gap, preferably of the same size. The specified pattern may be repeated as often as necessary to fully cover a particular curve.

Another simple dash pattern, in which only gaps are scalable, is illustrated by this example:

stroke (8, 8, 8), gap (2, 4, 8)

A phantom dash pattern, marked by a long stroke segment and then equal fixed-size (i.e., non-scaleable) gap, stroke and gap segments is exemplified by:

stroke (8, 16, 32), gap (4, 4, 4), stroke (4, 4, 4) gap (4, 4, 4)

An example hidden dash pattern, comprising a long fixed-size stroke then a short gap, a short fixed-size stroke, another short gap, another short fixed-size stroke and yet another short gap is as follows:

stroke (16, 16, 16), gap (2, 4, 8), stroke (2, 2, 2),
gap (2, 4, 8), stroke (2, 2, 2), gap (2, 4, 8)

TABLE 2 identifies fields or parameters for defining a Segment Definition List, according to an embodiment of the invention. As described above, an SDL comprises a list of Segments for drawing a path or curve, or a section of a path or curve.

TABLE 2

(Segment Definition List)

| Field | Description |
| --- | --- |
| numSegmentDefs | Integer value identifying the number of Segments in the Segment Definition List |

TABLE 2-continued (Segment Definition List)

| Field | Description |
| --- | --- |
| segmentList | Array or list of Segments, with numSegmentDefs members |

TABLE 3 identifies fields or parameters for defining a Segment Definition List Position (SDLP), according to an embodiment of the invention. In this embodiment, an SDLP identifies a particular Segment by its index in an SDL, and associates a particular offset with that Segment. The specified offset indicates where in the Segment the drawing of that Segment should begin or end. For example, to start drawing at the midpoint of the first Segment in a curve or sub-curve, an SDL may associate an offset of 0.5 with the Segment. Similarly, an offset of 0.5 for the last Segment for the curve indicates that rendering of that Segment should stop at the midpoint. Multiple SDLPs may reference a single Segment, with different offsets. As described below, SDLPs may be used as parameters in Segmentation Styles.

TABLE 3

(Segment Definition List Position)

| Field | Description |
| --- | --- |
| index | Integer value identifying a Segment in an SDL; 0 ≦ index < SDL.numSegmentDefs |
| offset | Offset into Segment; 0 ≦ offset ≦ 1 |

TABLE 4 identifies fields or parameters for defining a Segmentation Style (SS) according to one embodiment of the invention. In this embodiment, a Segmentation Style identifies an SDL for drawing a curve or a section of a curve, specifies (by SDLP) which Segment to start and/or end the path with, a minimum and/or maximum number of times for repeating the SDL, etc.

TABLE 4

(Segmentation Style)

| Field | Description |
| --- | --- |
| segmentDefList | A Segment Definition List |
| startAt | An SDLP identifying the Segment to apply at the start of the path or path section |
| endAt | An SDLP identifying the Segment to apply at the end of the path or path section |
| vertex | An SDLP identifying a Segment to apply at vertices of the path or path section |
| headerLength | Length of header to precede path |
| headerStart | Starting position of header |
| trailerLength | Length of trailer to follow path |
| trailerStart | Starting position of trailer |
| minInteriorReps | Minimum number of times to repeat SDL, excluding the starting (i.e., startAt) and ending (i.e., endAt) Segments |
| maxInteriorReps | Maximum number of times to repeat SDL, excluding the starting (i.e., startAt) and ending (i.e., endAt) Segments |
| paintStyleForTooFewReps | Paint Style to apply if curve is too short for minInteriorReps of the SDL |

The vertex parameter identifies a Segment to be placed at a vertex. Any Segment in the SDL may be used for vertices, and may be either a stroke segment or a gap segment, as desired. The vertex parameter may also apply to other critical points of a curve (e.g., cusp, corner, intersection), or other types of critical points may have their own SDLP parameters in the Segmentation Style.

The headerLength and trailerLength parameters indicate, respectively, how long a header or trailer to draw with the curve. If headerLength>0, a leading or header line segment is drawn in front of and tangential to the starting (startAt) segment. If trailerLength>0, a trailing line segment is drawn after and tangential to the ending (endAt) segment. The header and trailer may be drawn with a specified or default Paint Style. As described above, a Paint Style may specify parameters or constraints for rendering a curve, such as: a brush style (e.g., color or pattern), cap/join styles, how wide to draw the curve, miter limits, etc.

The minInteriorReps and maxInteriorReps parameters, respectively, indicate the (preferred) minimum and maximum times to repeat the SDL. An interior repetition may be defined as a full iteration of the SDL, from the first Segment in the list to the last. An interior repetition may be distinguished from an exterior repetition.

An exterior repetition comprises an iteration of the SDL from the startAt Segment to the last Segment of the list, or from the first Segment of the list to the endAt Segment. The former type of exterior repetition describes the first iteration of the SDL, while the latter describes the last. Thus, when drawing a dashed curve, the first and last iterations of the SDL are exterior repetitions, while all iterations between these are interior repetitions.

FIG. 1 portrays several pairs of dashed paths, to compare the output of a traditional drawing tool and an embodiment of the invention. Paths 102a, 112a, 122a, 132a and 142a are illustrative examples of dashed paths drawn by a traditional tool. Paths 102b, 112b, 122b, 132b and 142b are the same types of paths produced by an embodiment of the invention described herein.

The solid, lightweight lines underlying the dashed paths are included for the purpose of showing the true or intended shape of the path. Similarly, the solid lightweight line segments drawn perpendicular to the dashed paths at their endpoints are shown for the purpose of indicating the intended endpoints. It will be seen that some dashed paths drawn by a traditional tool do not reach their intended endpoints.

The paths of FIG. 1 characterize attempts to draw a simple dashed path with split stroke segments at the ends and vertices. The Segment Definition List for these paths includes just two Segments: stroke (4, 8, 16) and gap (4, 8, 16).

In the Segmentation Style for the paths of FIG. 1, the startAt, endAt and vertex parameters are identical and equal to (1, 0.5), meaning that these critical portions of the path (i.e., start point, end point and vertex) are to be aligned with the Segment having index 1 (i.e., the stroke segment) in the operative Segment Definition List, at the halfway (i.e., 0.5) point of the Segment.

The minInteriorReps and maxInteriorReps parameters of the Segmentation Style may have any appropriate values. For example, minInteriorReps may be 1, while maxInteriorReps may be 100. The Segment and Segmentation parameters are reported at the bottom of the figure.

Path 102a demonstrates the failure of a traditional drawing tool to allow split segments at the endpoints. Path 102b shows how more attractive split end segments are, particularly because they ensure the endpoints are marked. In path 102b, only one curve section needs to be defined to cover the full length of the path from the start to the end, because the only interesting or critical portions of the path are the endpoints.

Path 112a demonstrates the inability of the traditional tool to split a segment at a corner or vertex. Path 112b shows how much better a vertex looks when it is covered by split segments.

In one embodiment of the invention, each section of a path or curve is drawn separately after the interesting or critical points (e.g., endpoints, corners, vertices) are located. In this manner, constraints associated with interesting points or sections are applied to those features first, then the path or curve sections between the interesting features are drawn. Thus, path 112b may be divided into two path or curve sections for purposes of rendering, from the start to corner 113 and from corner 113 to the end.

Path 122a further shows the rigid end-to-end placement of segments in the traditional tool, in which only by chance do split segments coincide with critical portions of the path. By contrast, in path 122b the critical features (i.e., two corners and the endpoints) are handled first (i.e., with split segments) and then sections between those features are drawn. More particularly, for drawing purposes, each section may be assigned start and end points coinciding with the interesting features, and the specified parameters for the features (e.g., startAt, endAt, vertex) can then be applied. One or more segments are scaled in order to produce the desired simple dash pattern between the features while ensuring the result is visually pleasing.

In path 132a, the rigid placement of segments fails to clearly show where the step occurs. The step is clearer in path 132b, because the path is broken into sections on either side of the step, and the startAt and endAt parameters ensure that the step is marked.

Paths 142a, 142b show how intersecting paths may appear in the traditional tool, as opposed to an embodiment of the invention. In this embodiment, a Segmentation Style may include an "intersection" parameter identifying a Segment Definition List Position of a Segment to apply at path intersections.

FIGS. 2-3 depict dashed paths that may be generated in embodiments of the present invention, and demonstrate how constraints or parameters of a Segment or Segment Definition List may be altered to change a path's appearance.

FIG. 2A depicts dashed paths 102b, 112b, 122b, 132b and 142b of FIG. 1 as they would appear with different constraints or parameters. The parameters are listed in FIG. 2A and differ from the parameters applied in FIG. 1 in that the paths are to begin and end with full segments.

As described above, when each path or curve is to be rendered, interesting features are first located so that applicable parameters of the Segmentation Style (e.g., startAt, endAt) can be applied. Sections between the interesting features are then drawn based on the pattern of stroke and gap segments specified in the Segment Definition List. Some or all stroke and gap segments may be scaled (i.e., extended or shrunken) as necessary to make the resulting dashed path section attractive.

Intersections may or may not be treated specially. For example, the intersection in path 242 may be identified through a standard technique well known to those skilled in the art. And, because the intersection bisects gap segments of the intersecting paths, the result is attractive and need not be adjusted.

FIG. 2B depicts the dashed paths of FIG. 2A, formatted with different constraints and parameters. In particular, in these paths, only gap segments are scaleable. Stroke segments are fixed in size.

For the intersection in path 292, the vertical intersecting path is adjusted to place a stroke segment bisecting the intersection. Illustratively, if an "intersection" parameter were defined in addition to or instead of the "vertex" parameter describing the paths, the parameter may be defined as "intersection (2, 0.5)" for path 242, and "intersection (1, 0.5)" for path 292.

FIG. 3A depicts phantom dash patterns in which long stroke segments alternate with short stroke segments, separated by fixed size gap segments. Only the long stroke segments are scaleable. Note that vertices are bisected by the short stroke segment.

FIG. 3B depicts hidden dash patterns in which only gaps are scaleable. The paths begin and end with half of the first stroke segment (stroke (16, 16, 16)); vertices are bisected by the fourth segment (gap (2, 4, 8)), between the dots.

TABLE 5 identifies fields or parameters of a Paint Style, to indicate how a segment or curve should be painted or drawn, according to one embodiment of the invention.

TABLE 5

(Paint Style)

| Field | Description |
| --- | --- |
| paintStyleIndex | Index or identifier of the Paint Style |
| linewidth | Thickness of painted curve or Segment |
| capStyle | Cap style to apply (e.g., round, square, butt) |
| joinStyle | Join style to apply (e.g., round, bevel, miter) |
| miterLimit | Maximum sharpness of mitered corners |
| brushStyle | Defines color, pattern, transparency of curve |
| strokeAdjust | Indicates whether to refine pixilation to produce stroke widths that are more uniform |

TABLE 6 identifies fields or parameters of a Paint Style List (PSL), which comprises a list of Paint Styles in this embodiment of the invention. Illustratively, Paint Styles identified in a PSL may be matched up with individual Segments (or Segment Definition Lists) using a Segmentation Painting Style, as described below.

TABLE 6

(Paint Style List)

| Field | Description |
| --- | --- |
| numPaintStyles | Integer value identifying the number of Paint Styles in the list |
| styleList | Array or list of Paint Styles, with numPaintStyles members |

Illustratively, the value numPaintStyles may equal the value of numSegmentDefs of an SDL (Segment Definition List). Thus, for each Segment of the SDL a different Paint Style in the PSL may be used to draw the Segment.

TABLE 7 identifies fields or parameters of a Segmentation Painting Style (SPS) according to an embodiment of the invention. In this embodiment, the Paint Style List specified in the SPS is applied to paint the Segments listed in the Segmentation Style's SDL.

TABLE 7

(Segmentation Painting Style)

| Field | Description |
| --- | --- |
| segmentStyle | A Segmentation Style |
| paintStyleList | A Paint Style List |

Figure 4:
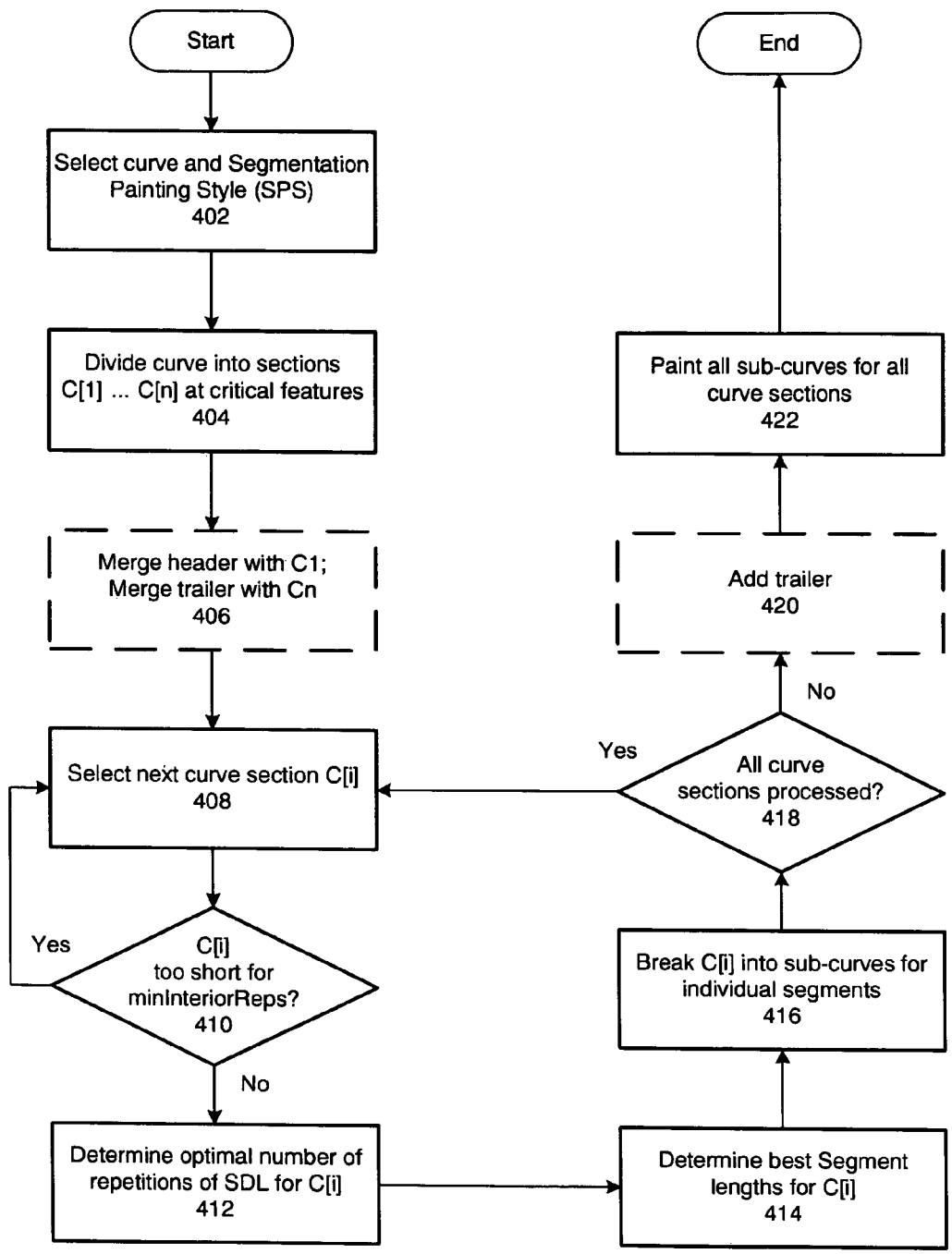
FIG. 4 is a flowchart demonstrating one method of drawing a dashed path, or facilitating the drawing of such a path, in accordance with an embodiment of the invention.

FIG. 4 is a flowchart demonstrating a method of drawing an attractive dashed path, according to one embodiment of the invention. In this embodiment, data structures corresponding to any or all of Tables 1-7 may be employed:

| | |
|---|---|
| Segment: | Table 1; |
| SDL or SegmentDefinitionList: | Table 2; |
| SDLP or SegmentDefinitionListPosition: | Table 3; |
| SS or SegmentationStyle: | Table 4; |
| PaintStyle: | Table 5; |
| PSL or PaintStyleList: | Table 6; |
| SPS or SegmentationPaintingStyle: | Table 7. |

In operation 402, a curve is defined or selected. For example, a user may operate a drawing tool to depict or outline the curve. Or, an existing curve to be drawn or re-drawn as a dashed path may be selected.

Also in operation 402, a Segmentation Painting Style (SPS) is defined by a user or selected from a collection. As described above, the SPS includes a Segmentation Style (SS) that identifies a Segment Definition List comprising a set of Segments. The SPS also includes a Paint Style List comprising a set of Paint Styles for drawing the Segments. The Segments may include virtually any number of stroke and gap segments, with various constraints (e.g., minimum, maximum and optimal lengths).

In the illustrated embodiment of the invention, the specified curve will be divided into one or more curve sections. More particularly, the SPS identifies a Segmentation Style defining a dashed path to be drawn, using the specified Segment Definition List (SDL) and Paint Style List (PSL). The Segments defined in the SDL, and/or SDL itself, may have various constraints, which will be used to drive the derivation of curve sections.

For example, if the SDL specifies that critical points or features of the curves (e.g., endpoints, vertices, corners, intersections, local minima, local maxima) are to be treated specially (e.g., as shown in FIGS. 1-3), then those points may be used to divide the curve into curve sections.

Thus, in operation 404, the initial curve is divided into curve sections at specified critical features. In one implementation, the curve is divided at non-differentiable points, which would include vertices and cusps, and may also be divided at points where the curve crosses itself or some other curve. In this embodiment of the invention, the SPS will be applied anew to each curve section. The result of operation 404 is a collection of n curve sections, which may be named C[1]-C[n].

Methods of identifying or locating vertices, cusps, intersections and other critical features of a curve are known to those skilled in the art, and need not be described herein.

As described further below, each curve section C will be further subdivided into sub-curves, with each sub-curve corresponding to one Segment (e.g., stroke or gap) to be drawn.

In optional operation 406, a header and/or trailer are added to the curve. A header is a curve or curve section to be added in front of or before the start of the initial curve. A trailer is a curve or curve section to be added after or following the end of the initial curve. In this embodiment of the invention, the trailer is merged with the first curve section C[1]. Similarly, the trailer is merged with curve section C[n]. In one alternative embodiment of the invention, a header or trailer may be added as an additional curve section (e.g., C[0], C[n+1]).

The following pseudo-code describes how a header and trailer may be added to the initial set of curve sections C[1]-C[n]:

C[1]=extendStart (C[1], SPS.SS.headerStart;
C[n]=extendEnd (C[n], SPS.SS.trailerStart).

The functions invoked in this pseudo-code would be designed to extend curve section C[1] to the starting point of the header and extend curve section C[n] to the end of the trailer.

In operation 408, a first (for the first invocation of operation 408) or next curve section C[i] is selected.

In operation 410, it is determined whether the selected curve section C[i] is too short to meet the minInteriorReps requirement of the operative Segmentation Style. As described earlier, if this is the case, a special Paint Style (identified by the paintingStyleForTooFewReps parameter) may be applied to the curve section.

In this implementation, in operation 410 a first calculation is performed to determine the minimum curve length for which the minInteriorReps requirement can be satisfied; illustrative pseudo-code is as follows:

minlens=list of SS.SDL.minLengths.
mincounts=CalcSegCounts(SS, SS.minInteriorReps)
mintotallen=CalcTotalLen(mincounts, minlens)

The value minlens comprises a list of the minLength parameters of the Segments defined in the SDL. The CalcSegCounts function determines the number of times each defined Segment in the SDL will be used to perform the specified number of repetitions of the defined Segments, and will encompass the specified minInteriorReps plus exterior repetitions. The CalcTotalLen function calculates and stores in mintotallen the length of a path comprising the specified (e.g., mincounts) number of repetitions of the defined Segments at their minimum lengths.

The indicated functions CalcSegCounts and CalcTotalLen are described by pseudo-code in FIG. 5.

Based on the value mintotallen, the following pseudo-code indicates whether the paintStyleForTooFewReps identified in SS.SDL (i.e., the Segmentation Style's SDL) should be applied for the curve section:

if length C[i]<mintotallen:
    S[i][1].curve=C[i];
    S[i][1].style=SS.paintStyleForTooFewReps;

In this pseudo-code, the array "S" stores the sub-curves into which a given curve section is broken or divided for purposes of laying out the individual Segments that will be used to draw the sub-curve. In this case, because the curve section is too short for the specified minimum number of repetitions of the SDL, only one sub-curve is defined.

If the curve section is determined to be too short in operation 410, the illustrated method returns to operation 408 after defining the curve section's single sub-curve. Otherwise, the method continues with operation 412.

In operation 412, the optimal number of repetitions (e.g., optnumreps) of the SDL is determined for the current curve section C[i]. First, the optimal length for the header and trailer alone (if they exist) is calculated:

optlens=list of SS.SDL.optimalLengths;
htcounts=CalcSegCounts(SS, 0);
htoptlen=CalcTotalLen(htcounts, optlens);

The value optlens stores the optimalLength parameters of the defined Segments. CalcSegCounts sets the number of repetitions of each Segment to zero, except for the starting (startAt) and ending (endAt) Segments to which the header and trailer were appended. CalcTotalLen yields the total length of the starting and ending Segments.

Then, the optimal length of one full repetition of the SDL can be calculated:

onerepoptlen=0;
foreach Segment in SS.SDL:
   onerepoptlen += Segment.optimalLength;

Next, a number of repetitions of the SDL is chosen so as to get as close as possible to the length of curve section C[i]:

optnumreps=round((length(C[i])−htoptlen)/onerepoptlen)

In operation 414, the best lengths of the Segments of SS.SDL are selected for curve section C[i]. More particularly, starting with each Segment's optimal length, the Segments are stretched or compressed to best fit C[i]. In one implementation, no Segments are stretched beyond their maxLength parameters or compressed below their minLength parameters.

FIG. 6 describes a function ExpandUniformlyUpTo for uniformly expanding or stretching Segments toward (or beyond) their maximum lengths. FIG. 7 describes a similar function ShrinkUniformlyDownTo for uniformly shrinking Segments toward (or below) their minimum lengths.

FIG. 6 also presents the CalcBestLengths function for determining the best lengths of the Segments for C[i], using ExpandUniformlyUpTo (and ShrinkUniformlyDownTo). These best lengths may be stored in a list or array (e.g., "bestlens").

In operation 416, the current curve C[i] is broken into sub-curves which, when rendered end-to-end, are graphically equivalent to C[i]. The sub-curves may be referred to as S[i][j], wherein [i] is the index (1-$n$) of the curve section (i.e., C[i]) being broken up, and [U] is the index (1-$m$) of the sub-curves being defined. FIG. 8 describes one algorithm for performing operation 416.

In the algorithm of FIG. 8, the collection of sub-curves S[1]-S[m] is generated based on the best lengths of each Segment calculated in operation 414. Each sub-curve is associated with the Segment's corresponding Paint Style (from SPS.PSL).

In operation 418, if all curve sections C[1]-C[n] have been processed, the illustrated method of the invention proceeds to operation 420. Otherwise, the method returns to operation 408 to process the next curve section.

In optional operation 420, the header and/or trailer (if any) may be added to the path if not added earlier. In particular, in one alternative embodiment of the invention, a header and/or trailer may be added in operation 420 after the dashed path is produced. In this alternative embodiment, the header/trailer may or may not be dashed.

In the embodiment of the invention depicted in FIG. 4, the header and trailer are added before dashing is applied, thereby including them in the process of making the curve dashed.

Finally, in operation 422, all sub-curves for all curve sections are painted with the appropriate Paint Styles. In particular, for each curve section C[i] (where i=1 to n), the associated S[i][j].curves are rendered with corresponding S[i][j].styles (where j=1 to m). After operation 422, the illustrated embodiment of the invention ends.

The method presented in FIG. 4 and described above and in conjunction with FIGS. 5-8 is just one method of rendering a dashed path in an attractive fashion. Other methods may be derived from the description without exceeding the scope of the current invention.

FIGS. 9-12 illustrate dashed paths that may be produced by embodiments of the invention. In these examples, the shaded area indicates the curve or shape to which the dashed paths apply.

FIG. 9 depicts centerlines for ovoid shapes—circle 902, ellipse 904 and ellipse 906. For each shape, multiple centerlines are rendered to mark the shape's center relative to a line extending through the center to both sides. In this embodiment of the invention, the Segment Definition List includes the following defined Segments:

(1) a short fixed-size stroke;
(2) a short fixed-size gap;
(3) a variable-size stroke; and
(4) another short fixed-size gap.

In the Segmentation Style, the startAt and endAt parameters both refer to Segment 1, with identical offsets of 0.5. Thus, each centerline begins at the midpoint of Segment 1, ends at the same place, and includes a header and trailer to better mark where the centerline crosses the boundary of the shape.

The minInteriorReps and maxInteriorReps parameters are both equal to 1. A first, exterior, repetition of the SDL covers the first half of each centerline, then a second, interior, repetition covers the second half. The variable-size strokes will scale equally to make the result attractive.

In one alternative embodiment of the invention, a "centerpoint" constraint could have been added (to the Segmentation Style) to ensure a short fixed-size stroke segment bisected the center.

Figure 10:
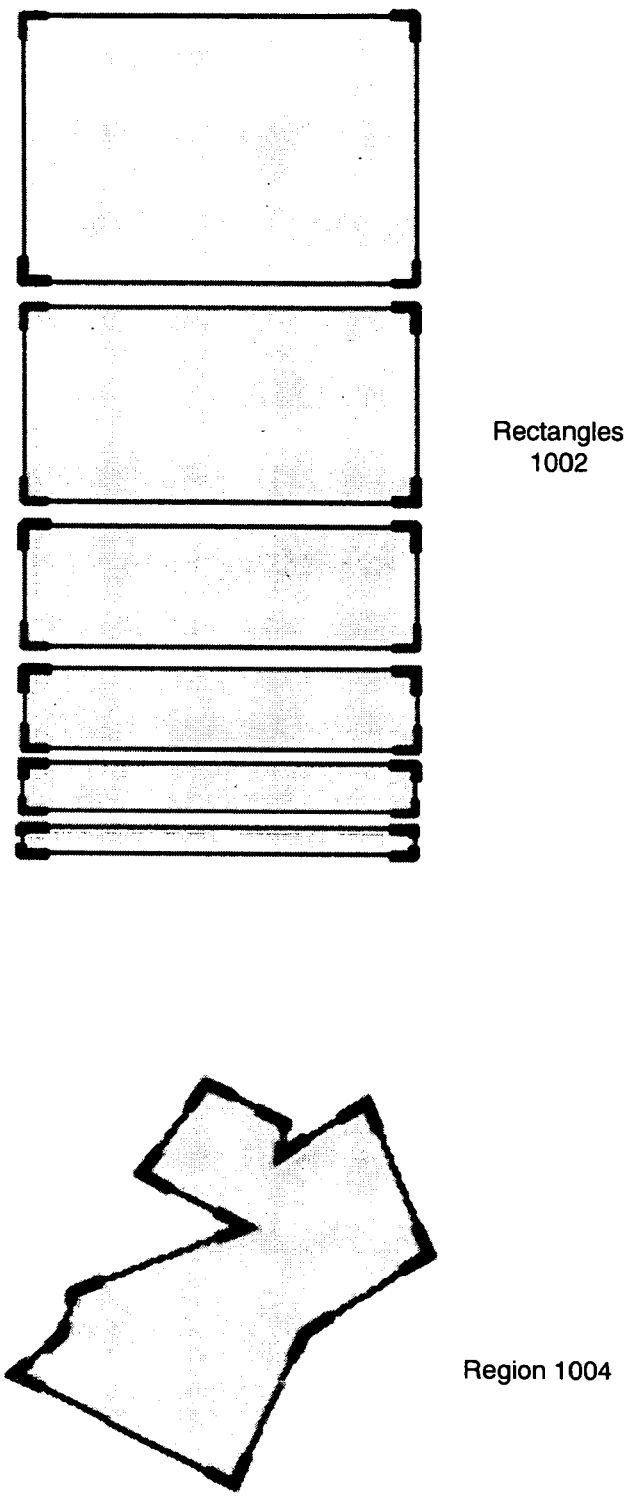

FIG. 10 depicts the use of an embodiment of the invention to mark only the corners of a two-dimensional area. Illustratively, this may be facilitated by setting corner or vertex constraints requiring such points or features to be marked by centered stroke segments. As a result, each corner of rectangles 1002 and region 1004 is bisected by a fixed-size stroke segment. Alternatively, the corners may be used to break each curve into curve sections, as described above, and each curve section may be rendered using an SDL having just two segments: a fixed-size stroke segment and a variable size gap segment. In this example, the fixed-size stroke begins and ends at its midpoint.

Figure 11:
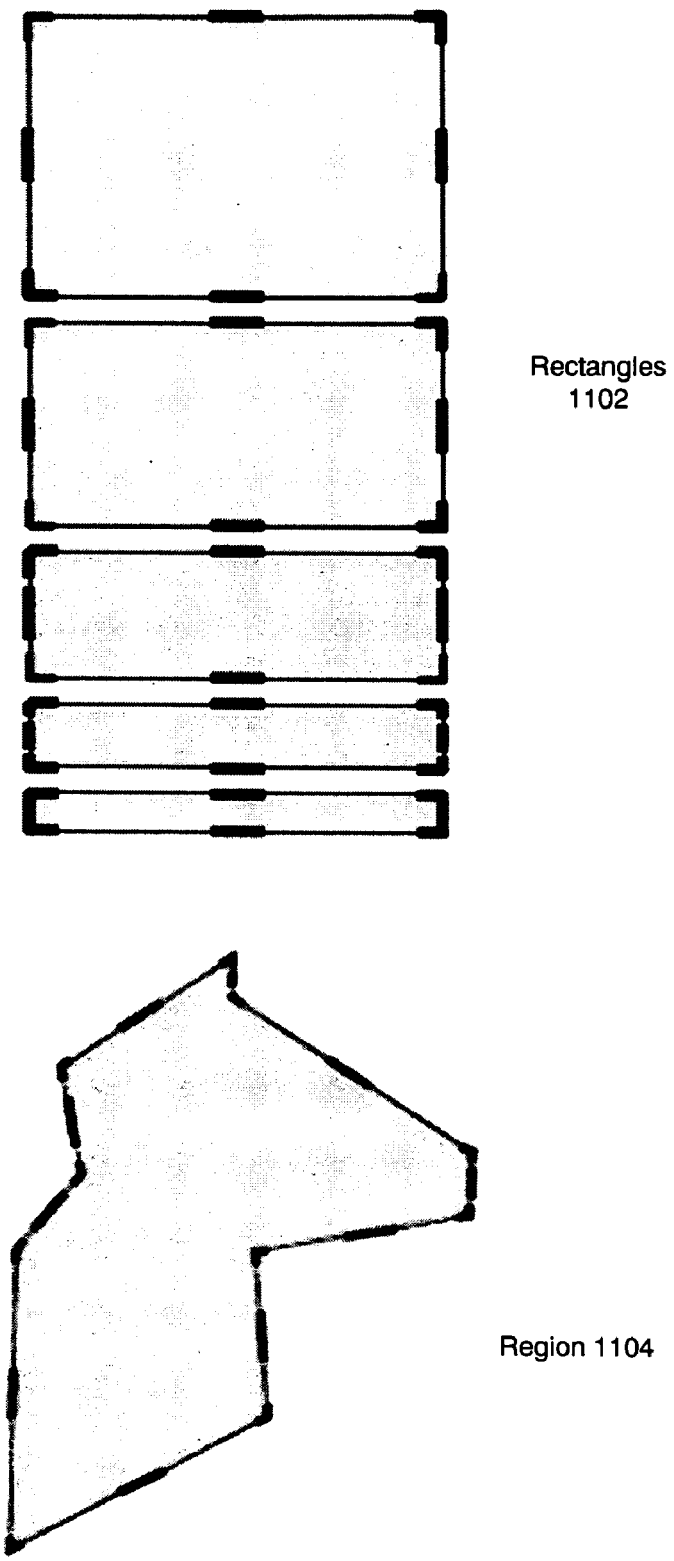

FIG. 11 also depicts corner marking, similar to FIG. 10, but with a single constant-size stroke segment added on each edge between the corners.

Figure 12:
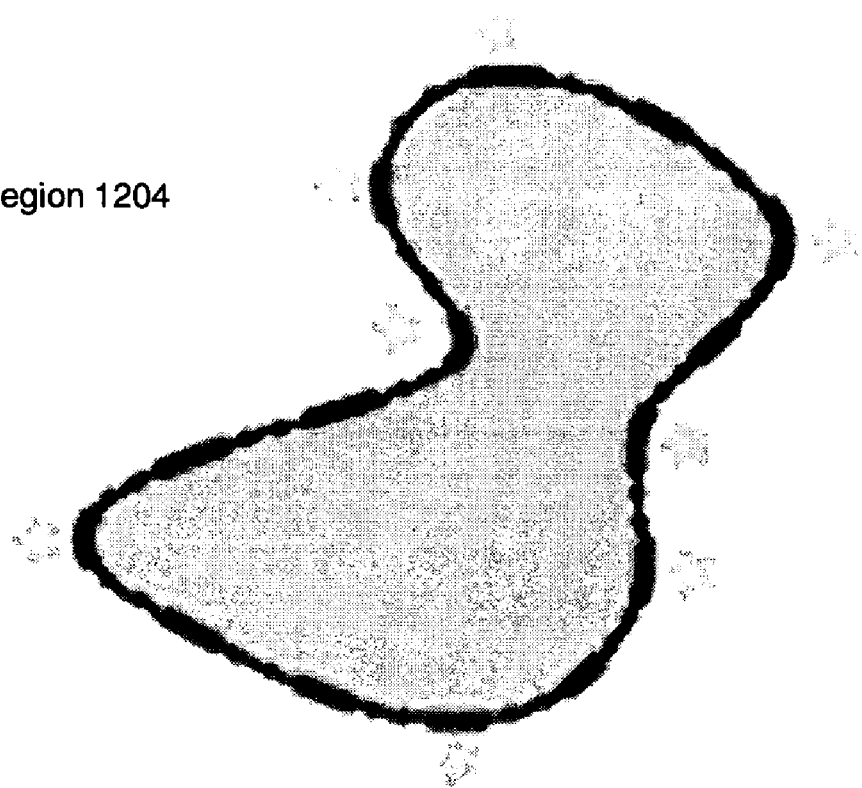

In FIG. 12, local minima and maxima (marked by stars) of two-dimensional region 1202 are marked by stroke segments. In this embodiment, local minima and maxima are identified as critical points of the path, with constraints requiring them to be bisected by fixed-size stroke segments. The dashing pattern between minima and maxima scale independently so as to make a visually pleasing result.

Another embodiment of the invention may be employed to produce an N-dimensional drawing (N>1). In this embodiment, Segment Definition Lists (SDL) are assembled for each dimension. The SDLs may contain the same, different or overlapping sets of Segments. Each Segment, however, is defined as an N-dimensional pattern, and need not be solid (e.g., a stroke) or empty (e.g., a gap).

Illustratively, each dimension of the surface to be drawn may be divided into curve sections (e.g., at critical features) as described above. Then, for each curve section, the desired Segments may be scaled to fit, possible by breaking the curve section into Segment-sized pieces, also as described above.

For example, a 2-dimensional implementation may involve defining partitioning patterns (e.g., Segmentation Styles) in each dimension (e.g., horizontal and vertical). A two-dimensional array is employed, having the same configuration (i.e., rows and columns) as the two-dimensional partitioning pattern.

The partitioning patterns are then applied independently in the horizontal and vertical directions (e.g., in checkerboard fashion). Thus, each "tile" in the "checkerboard" is derived from one Segment (or Segment Definition List) in the horizontal pattern and one Segment from the vertical pattern.

In one embodiment of the invention designed to produce a dashed shape in N-dimensional shape, given an N-dimension manifold in M-dimensional space, and a one-to-one mapping from the N-manifold into an N-dimensional "rectangle" in N-dimensions (e.g., an "N-rectangle"), we can make the rectangle dashed as follows.

First, 1-dimensional segment definitions are generated for each axis of the N-rectangle. An algorithm described above in conjunction with FIG. 4 is then applied to split each axis into segments. Each point on the N-rectangle can be described by where it projects onto each of the axes (e.g., its Cartesian coordinates). It can then be determined which segment number each of these coordinates falls into for each axis.

This provides an N-tuple of "segment numbers," one for each axis. Using a table of painting styles, we look up the applicable paint style using this N-tuple. Now we have a segmented and painted N-rectangle. Because there is a one-to one mapping from the N-manifold into the N-rectangle, each point in the N-manifold is drawn or rendered with the paint applied to its corresponding point in the N-rectangle. This allows the entire N-manifold to be painted with a sophisticated pattern.

A very simple example is a bezier sheet, which is a bidirectional mapping from a unit square onto a surface in 3 D. In this example, to get an 8×8 checkerboard, two repeating segments are defined, one for the x-axis and one for the y-axis. Each segment has constraints regarding their minimum and maximum length. In this example, each is of fixed size:

x-axis: 0.125, 0.125
y-axis: 0.125, 0.125

The paint table (a 2×2 array) to produce the black and white checkerboard pattern may be defined as:

|   | 0 | 1 |
|---|---|---|
| 0 | black | white |
| 1 | white | black |

This would allow something like an animated flag to be checkered.

Another alternative embodiment of the invention for N-dimensions may require that the mapping from the N-manifold to the N-rectangle be an isometry (distances are preserved). This would mean that a plaid pattern could be defined in two-space, and used to paint skirts on CG characters, for example. Furthermore, due to the constraints based rules, one could ensure the patterns match up at boundaries where manifolds meet, and are "sewn" together. This would produce a much more attractive result than just checkering each and butting them up against one another.

Notions of intersections, vertices, cusps, etc., all are meaningful in an N-manifold as well. And, recursive segmentation and paint styles could yield fractal patterns and other special effects.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of drawing a dashed curve, the method comprising:
    using a computer to perform:
        defining a set of segments, including one or more stroke segments and one or more gap segments, wherein each segment has associated constraints including:
        a minimum length;
        a maximum length; and
        an optimal length;
        dividing a curve into one or more curve sections; and
        drawing each curve section with segments from the set of segments to produce a dashed curve, wherein said drawing includes scaling a first segment a first percentage from its optimal length and scaling a second segment a different percentage from its optimal length.

2. The method of claim 1, wherein each defined segment includes a beginning and an end, and drawing a first curve section comprises:
    drawing an initial segment in the set of segments, from a point other than the beginning of the initial segment to the end of the initial segment;
    drawing one or more additional segments in the set of segments, from the beginning of each additional segment to the end of the additional segment; and
    drawing a final segment in the set of segments, from the beginning of the final segment to a point other than the end of the final segment.

3. The method of claim 1, wherein the constraints associated with a segment further include one or more of the following:
    a color;
    a width;
    a cap style; or
    a join style.

4. The method of claim 1, wherein the set of segments has associated constraints including:
    a minimum number of times to repeat the set of segments when drawing a curve section; and
    a maximum number of times to repeat the set of segments when drawing a curve section.

5. The method of claim 1, further comprising:
    identifying one or more critical points of the curve, said critical points including two or more of:

a starting point;
an ending point;
an intersection with another curve;
a corner;
a cusp;
a local minima; and
a local maxima.

6. The method of claim 5, wherein each said identified critical point has an associated constraint specifying the type of segment in the set of segments by which said critical point should be bisected.

7. A computer readable memory storing instructions that, when executed by a computer, cause the computer to perform a method of drawing a dashed curve, the method comprising:

defining a set of segments, including one or more stroke segments and one or more gap segments, wherein each segment has associated constraints including:
a minimum length;
a maximum length; and
an optimal length;
dividing a curve into one or more curve sections; and
drawing each curve section with segments from the set of segments to produce a dashed curve, wherein said drawing includes scaling a first segment a first percentage from its optimal length and scaling a second segment a different percentage from its optimal length.

* * * * *

UNITED STATES PATENT AND TRADEMARK OFFICE
CERTIFICATE OF CORRECTION

| | | |
|---|---|---|
| PATENT NO. | : 7,589,730 B1 | Page 1 of 1 |
| APPLICATION NO. | : 11/134761 | |
| DATED | : September 15, 2009 | |
| INVENTOR(S) | : Donald P. Brown | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Twenty-first Day of September, 2010

David J. Kappos
*Director of the United States Patent and Trademark Office*